(12) United States Patent
Li et al.

(10) Patent No.: US 9,208,414 B2
(45) Date of Patent: Dec. 8, 2015

(54) BI-COLOR DUPLEX PRINTING METHOD AND DEVICE

(75) Inventors: Linyi Li, Beijing (CN); Weiping Huang, Beijing (CN)

(73) Assignees: Peking University Founder Group Co., Ltd., Beijing (CN); Peking University, Beijing (CN); Beijing Founder Electronics Co., Ltd., Beijing (CN); Peking University Founder R & D Center, Beijing (CN)

( * ) Notice: Subject to any disclaimer, the term of this patent is extended or adjusted under 35 U.S.C. 154(b) by 74 days.

(21) Appl. No.: 13/997,667

(22) PCT Filed: Dec. 24, 2011

(86) PCT No.: PCT/CN2011/084597
§ 371 (c)(1),
(2), (4) Date: Sep. 24, 2013

(87) PCT Pub. No.: WO2012/083887
PCT Pub. Date: Jun. 28, 2012

(65) Prior Publication Data
US 2014/0009771 A1    Jan. 9, 2014

(30) Foreign Application Priority Data

Dec. 24, 2010 (CN) .......................... 2010 1 0622091

(51) Int. Cl.
| | | |
|---|---|---|
| H04N 1/60 | (2006.01) | |
| G06K 15/02 | (2006.01) | |
| B41J 2/21 | (2006.01) | |
| G06F 3/12 | (2006.01) | |
| B41J 3/60 | (2006.01) | |
| H04N 1/56 | (2006.01) | |

(52) U.S. Cl.
CPC ........... *G06K 15/1878* (2013.01); *B41J 2/2132* (2013.01); *G06F 3/122* (2013.01); *G06F 3/1215* (2013.01); *G06F 3/1244* (2013.01); *B41J 3/60* (2013.01); *G06F 3/125* (2013.01); *H04N 1/56* (2013.01)

(58) Field of Classification Search
None
See application file for complete search history.

*Primary Examiner* — Barbara Reinier
*Assistant Examiner* — Christopher D Wait
(74) *Attorney, Agent, or Firm* — Lathrop & Gage LLP

(57) ABSTRACT

The application discloses a method for double-sided printing with two colors. The method comprises a step of receiving two pages of original four-color page lattice according to a printing order each time, a step of extracting effective data of first and second colors in the two pages of original four-color page lattice, respectively and a step of writing the data of the first and second colors extracted respectively into data of first color, second color, third color and fourth color of a new page of four-color page lattice, respectively. The application discloses an apparatus for double-sided printing with two colors including a printing controller, and the printing controller includes an original page receiving module configured to receive two pages of original four-color page lattice according to a printing order each time, an extracting module configured to extract effective data of first and second colors in the two pages of original four-color page lattice, respectively, and a new page generating module configured to write the data of the first and second colors extracted respectively into data of first color, second color, third color and fourth color of a new page of four-color page lattice, respectively. The invention improves the printing efficiency.

15 Claims, 8 Drawing Sheets

Sending the first page to the digital control system

Sending the second page to the digital control system

Sending the nth page to the digital control system

Sending the first page to the digital control system

Sending the second page to the digital control system

Sending the nth page to the digital control system

| | |
|---|---|
| M | Sending first page to a digital control system |
| K | |
| M | Sending second page to the digital control system |
| K | |
| M | |
| K | |
| M | |
| K | |
| ... ... | Sending the $3^{rd}$ - $n-1^{th}$ pages to the digital control system |
| M | Sending the $n^{th}$ page (i.e. the last page) to the digital control system |
| K | |
| 0 | |
| 0 | |

FIG. 5

BI-COLOR DUPLEX PRINTING METHOD AND DEVICE

CROSS REFERENCE TO RELATED APPLICATIONS

This application is a 35 USC §371 National Stage application of International Application No. PCT/CN2011/084597 filed Dec. 24, 2011, which claims the benefit of priority to China Patent Application No. 201010622091.4 filed Dec. 24, 2010. The disclosure of each of the prior applications is considered part of and is incorporated by reference in the disclosure of this application.

TECHNICAL FIELD

The present application relates to the field of printing, in particular, to methods and apparatuses for double-sided printing with two colors.

BACKGROUND

A raster image processor (RIP) is used to convert a page description file (such as a PDF file generated by typesetting software) to a raster image and to output the raster image from a raster imaging device, such as an image setter, a computer-to-plate machine and a digital printer. Any pending print jobs are to be processed through the RIP in order to generate a rasterized image lattice corresponding to each page (hereafter referred to as a page lattice).

A printing controller is provided on a host computer to read the page lattices of the printing jobs from a hard disk and to send printing configuration parameters, control commands, and printing data in order to control the printing process.

A digital control system (DCS) is configured to receive the commands and printing data from the host computer and to drive a spray nozzle of the printer to print in accordance with the commands.

A printing process of an inkjet digital printer includes typesetting the pending print jobs by typesetting software, rasterizing the pending print jobs through the RIP and generating the page lattice available to the inkjet printer. Furthermore, the process further includes receiving the page lattice by the printing controller of the host computer, sending by the controller the received page lattice to the DCS of the inkjet printer and sending by the DCS the page lattice to the spray nozzle to print.

The printing data is sent to the DCS in pages, and thus the printing controller prepares the page lattice in pages. As shown in FIG. 1, the printing data of one page are sent to the DCS after they are prepared.

One of primary uses for double-sided printing with two colors is for printing certain government documents which only need black and red colors, but both sides of a printing stock need to be printed.

In the prior art, a printing process of a double-sided printing with two colors includes: dividing the pending print jobs into odd and even pages; preparing, by the printing controller, page lattices of the odd pages; and sending the page lattices of the odd pages to the DCS. Rectos of the printing stocks are passed through former two colors of the spray nozzle, and the DCS controls the nozzle to print the data of the odd pages on the rectos. Then, the printing stocks are passed through a turnover mechanism. After the printing stocks are turned over, versos of the printing stocks are passed through latter two colors of the spray nozzle. The printing controller sends the page lattice of the even pages to the DCS, and the DCS controls the nozzle to print the data of the even pages on the versos.

In view of the above, for the double-sided printing of the prior art, there is a need to send data of a page for printing the page, which causes a frequent sending of the data and thus reduces the processing efficiency.

SUMMARY

The present application seeks to provide methods and apparatuses for double-sided printing with two colors to solve the problem of the low processing efficiency of the double-sided printing in the prior art.

According to one embodiment of the present application, a method for double-sided printing with two colors is provided. The method may include a step of receiving two pages of an original four-color page lattice according to a printing order each time, a step of extracting effective data of first and second colors in the two pages of the original four-color page lattice, respectively, and a step of writing the extracted data of the first and second colors into data of a first color, a second color, a third color and a fourth color of a new page of four-color page lattice, respectively.

According to another embodiment of the present application, an apparatus for double-sided printing with two colors including a printing controller is provided. The printing controller may include an original page receiving module configured to receive two pages of an original four-color page lattice according to a printing order each time, an extracting module configured to extract effective data of first and second colors in the two pages of the original four-color page lattice, respectively, and a new page generating module configured to write the data of the first and second colors extracted respectively into data of a first color, a second color, a third color and a fourth color of a new page of four-color page lattice, respectively.

The method and the apparatus for double-sided printing with two colors according to the embodiment of the present invention will combine each two page lattices to one page lattice so as to overcome the problem of the low processing efficiency of the double-sided printing in the prior art and to improve the printing efficiency.

BRIEF DESCRIPTION OF THE DRAWINGS

The drawings described herein are used to provide a further understanding to the present application and constitute a part of this specification. Exemplary embodiments of the present application and their descriptions serve to explain the present application and do not constitute improper limitations on the present application.

FIG. 5 is a schematic diagram illustrating data processing for a four-color printing according to a preferable embodiment of the present application, in which the last page is an odd page.

DETAILED DESCRIPTION

Hereinafter, the present application will be explained in detail with reference to the accompanying drawings in connection with the embodiments.

Figure 1:
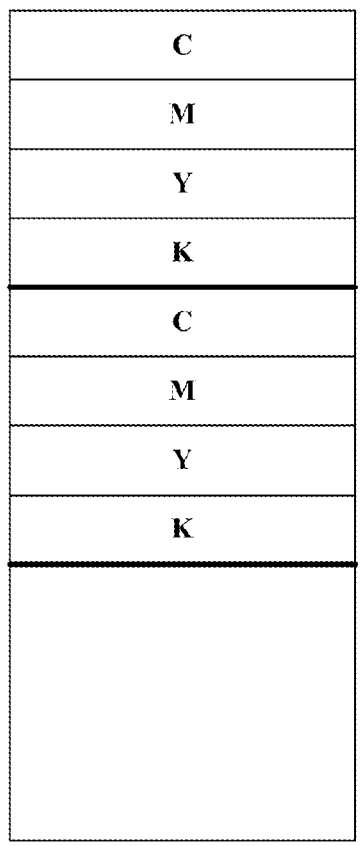
FIG. 1 is a schematic diagram illustrating a data processing for a four-color printing in the prior art.
Figure 2:
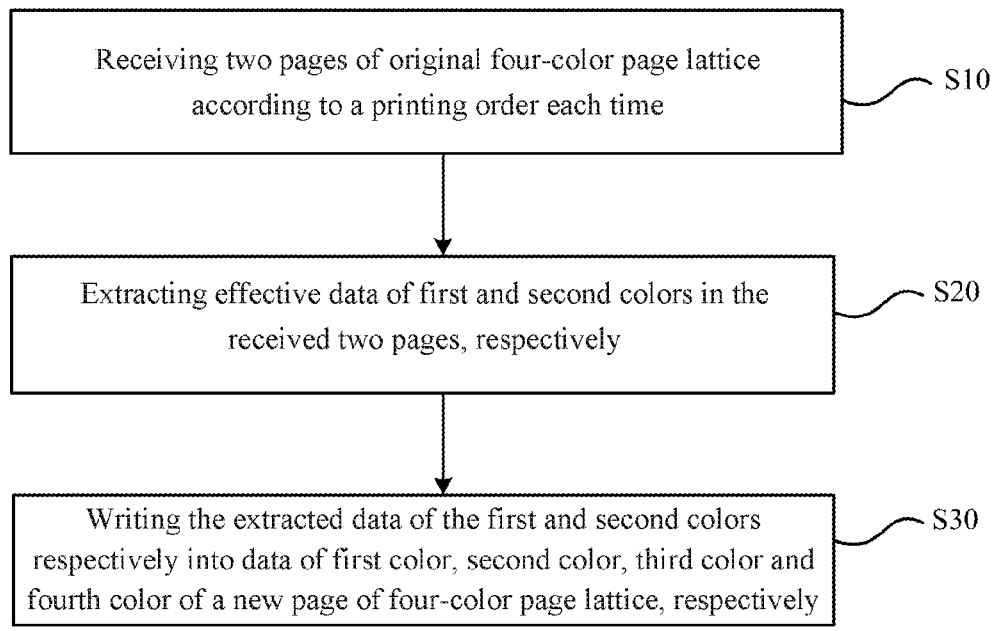
FIG. 2 is a flowchart illustrating a method for double-sided printing with two colors according to an embodiment of the present application.

FIG. 2 is a flowchart illustrating a method for double-sided printing with two colors according to an embodiment of the present application, the method may include: a step S10 of receiving two pages of original four-color page lattice according to a printing order each time; a step S20 of extracting effective data of first and second colors in the received two pages, respectively; and a step S30 of writing the extracted data of the first and second colors respectively into data of first color, second color, third color and fourth color of a new page of four-color page lattice, respectively.

The existing printing software is all for CMYK four-color printing system. Therefore, if only two specific colors are used to print, the data of the two colors are effective in the page lattice generated by double-sided printing with the two colors. However, for the double-sided printing of the prior art, there is a need to send page data so as to print the page each time. That is, if there are n pages need to be printed, n pages data will be sent, which increases the sending frequency and causes a low processing efficiency. According to the embodiment of the invention, the data of two ineffective colors are abandoned in advance such that the two page lattices may be combined to one page lattice. In this regard, when the recto and verso of one page need to be printed, there is only a need to send the data of one page. That is, if there are n pages need to be printed, data of n/2 pages are sent, which reduces half of the sending frequency. Therefore, the method according to the embodiment of the invention solves the problem of the low processing efficiency of the double-sided printing in the prior art and thus improves the printing efficiency.

Figure 3:
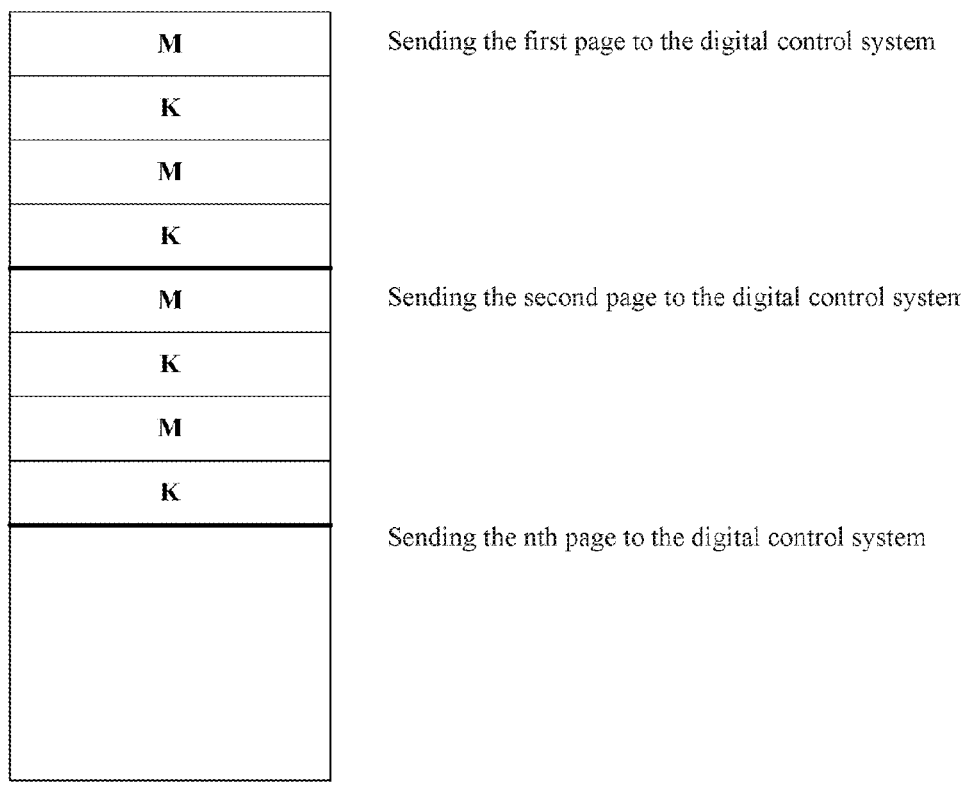
FIG. 3 is a schematic diagram illustrating data processing for a four-color printing according to a preferable embodiment of the present application.

Preferably, two pages of the original four-color page lattice are received according to a printing order from a first page each time. The embodiment may be for the double-sided printing with two colors, in which the first page may be printed on a recto. FIG. 3 is a schematic diagram illustrating data processing for a four-color printing according to a preferable embodiment of the present application. For example, for certain government documents that need to be printed, there are only black and red colors when typesetting in a front end. When the page lattices are generated by RIP rasterizing, the data of the page lattices may still be stored in accordance with four-color CMYK. That is, the data of red color may be stored in M color and the data of black color may be stored in K color, the data of C and Y colors are ineffective data. When the printing controller prepares the data to be printed, the data of the four colors are read into a cache. After the data of the first page are prepared, the data may not be sent immediately, the data of the M and K colors of the first page may be retained and the data of the C and Y colors may be abandoned. Then, the printing controller reads data of the four colors of second page from a hard disk, and the data of M and K colors are still retained and the data of C and Y colors are abandoned. Then, the data of M and K colors of the first page and the data of M and K colors of the second page may be used as the four colors of one side of one page and may be sent to the DCS. Here, the first page refers to a first page which is actually printed rather than a first page generated by typesetting. The pending print jobs generated by typesetting may be provided as n pages through RIP rasterizing, the actual printing can start from any one of the n pages. For example, the user wants to print from m page to n page of the jobs, the data of the m page refer to the data of the above-mentioned first page, and the data of m+1 page refer to the data of the above-mentioned second page, and so on.

Preferably, two pages of the original four-color page lattice are received according to a printing order from a second page each time. Before this receiving step, the method may further include: receiving a first page of the original four-color page lattice; generating a new first page of a four-color page lattice, in which the data of first and second color may be set to null values; and writing the data of the first and second colors of the first page of the original four-color page lattice into third and fourth colors of the new first page of the four-color page lattice. Because of the special needs, sometimes the data of the first page need to be printed on a verso and a recto is blank. The method according to the embodiment can meet the needs.

Figure 4:
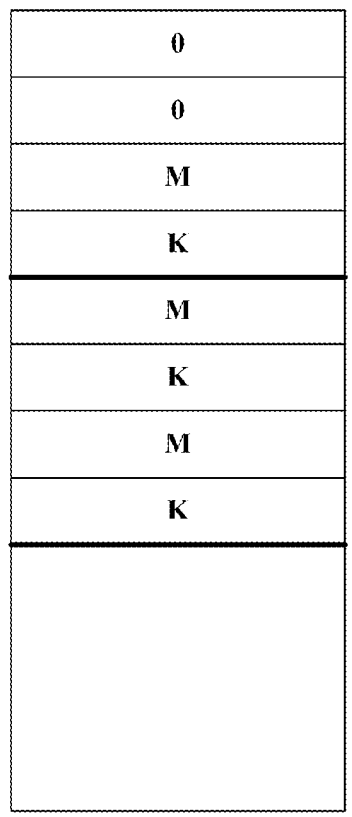
FIG. 4 is a schematic diagram illustrating data processing for a four-color printing according to a preferable embodiment of the present application, with null values in a front page.

FIG. 4 is a schematic diagram illustrating data processing for a four-color printing according to a preferable embodiment of the present application, with null values in a front page. The user may be provided with an option that the first page may be printed on a recto or a verso. When the user choose to print on the verso, the data of the former two colors in the storage space are set to null values and the data of M and K colors of the first page may be set to the latter two colors in the storage space.

Preferably, in the case of receiving two pages of the original four-color page lattice according to a printing order each time, if a single page of the original four-color page lattice is remained in the end, then the method further include generating a last page of new four-color page lattice; writing the data of the first and second colors of the remained single page into first and second colors of the last page of the new four-color page lattice; and setting the third and fourth colors of the generated last page to null values. The method according to the embodiment can be performed where the last page is a single page on the recto.

FIG. 5 is a schematic diagram illustrating data processing for a four-color printing according to a preferable embodiment of the present application, in which the last page is an odd page. When the last page generated by front-end typesetting is an odd page, there are only data of former two colors. In order to ensure the integrity of the data received by the DCS, the data of the latter two colors in the storage space are set to null values and then are sent to the DCS.

Preferably, the method may further include: receiving each page of new four-color page lattice according to a printing order; extracting data of first and second colors of the new four-color page lattice and printing the extracted data to a first side of a printing stock; extracting data of third and fourth colors of the new four-color page lattice and printing the extracted data to a second side of a printing stock. The method may further include presetting pigments of the first and third colors of the printing device to pigment of a first special color (such as red color) and presetting pigments of the second and fourth colors of the printing device to pigment of a second special color (such as black color).

In the prior art, a single side printing and a double-sided printing need different processes and need to modify interface protocols of printing controller and DCS of the host computer. Therefore, flexibility of switching between the single side printing and the double-sided printing cannot be achieved. However, sometimes the user needs to print single side and sometimes to print double side in the same platform. If the user uses two sets of printing controllers and the DCS systems, it causes obviously a higher cost.

According to the preferable embodiment of the invention, the DCS may not need to distinguish between the single side printing and the double-sided printing and may receive the data and print the data in accordance with the single side printing. The printing stock firstly is passed through the former two colors of the spray nozzle and the data of M and K colors of the first page are printed on the recto of the printing stock. Then the printing stock is passed through the turnover mechanism and the verso of the printing stock is passed through the latter two colors of the spray nozzle. The DCS controls the nozzle to print the data of the M and K colors of the second page on the printing stock to complete the double-sided printing with two colors. This will obviously reduce the printing cost.

Figure 6:
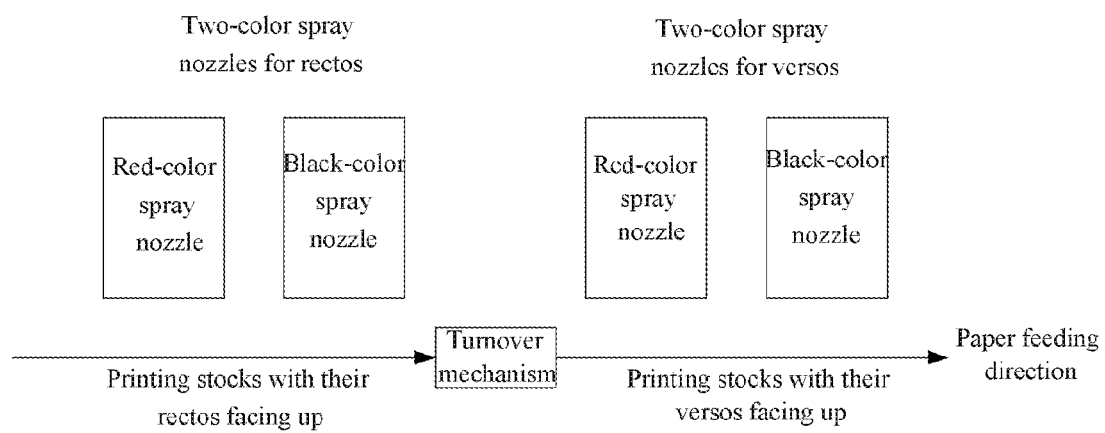
FIG. 6 is a paper advancing schematic diagram illustrating double-sided printing with two colors according to a preferable embodiment of the present application.

FIG. 6 is a paper advancing schematic diagram illustrating double-sided printing with two colors according to a preferable embodiment of the present application. After the first side is printed, the printing stock is turned over and the second side is printed.

Figure 7:
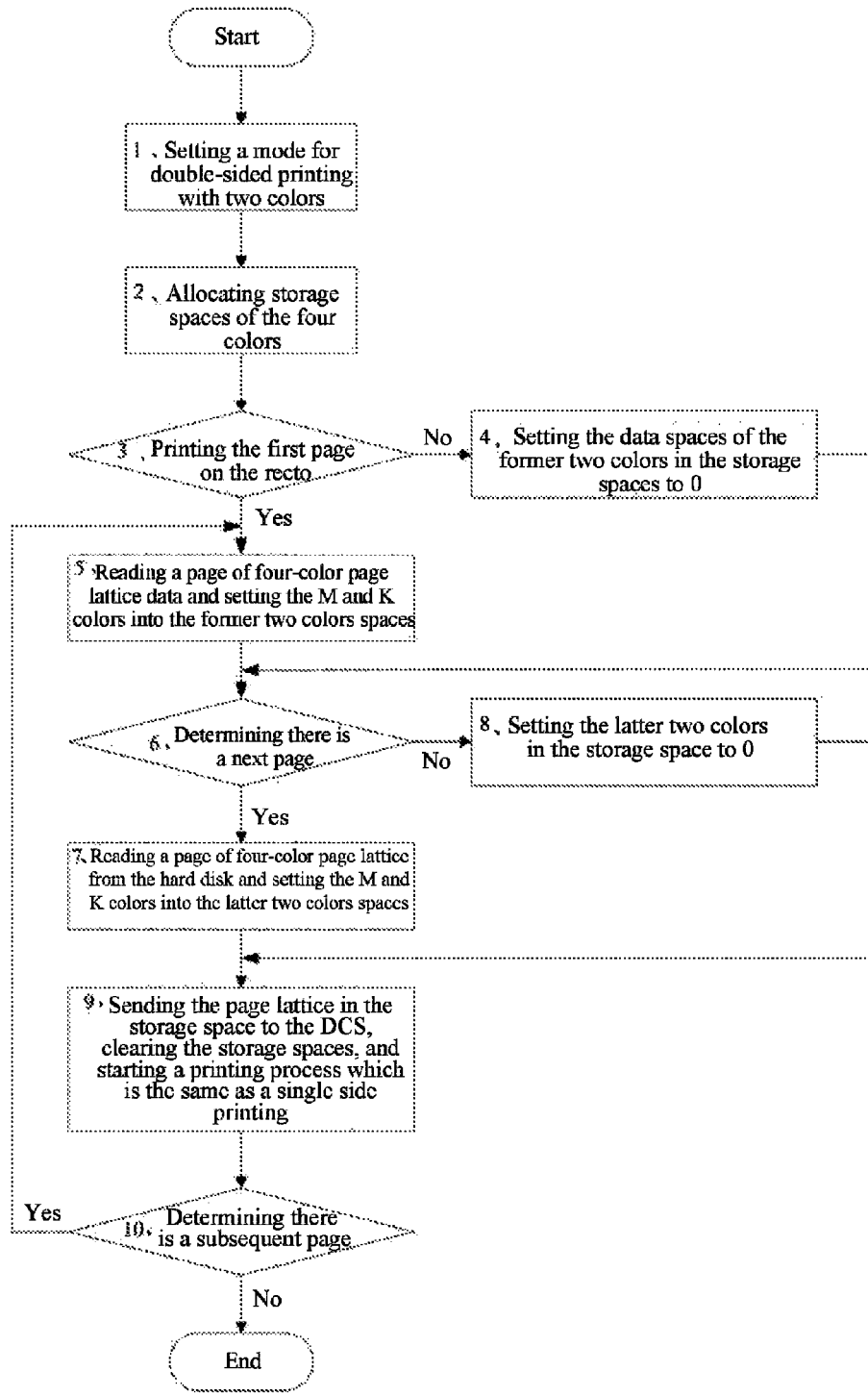
FIG. 7 is a flowchart illustrating a method for double-sided printing with two colors according to a preferable embodiment of the present application.

FIG. 7 is a flowchart illustrating a method for double-sided printing with two colors according to a preferable embodiment of the present application. The method may include the following.

1. A step of setting a mode for double-sided printing with two colors. In this step, ink of four colors C, M, Y and K is changed to ink of two colors, i.e. red and black, or black and red. The printing stock is passed through a turnover mechanism such that two sides of the printing stock can be printed. And then the double-sided printing with two colors may be chosen on a printing interface.

2. A step of allocating storage spaces of the four colors by a controlling system. In this step, the recto of the printing stock is passed through the former two colors nozzle to complete the recto printing, and then the printing stock is passed through the turnover mechanism to reach the latter two colors nozzle to complete the verso printing. In order to overprint the recto and verso and to print correctly, the cache of the latter two colors in the DCS has to be big enough and a size of the cache is depending on a distance passed through by the printing stock from the former two colors nozzle to the latter two colors nozzle. If the size of the cache for the latter two colors nozzle in the DCS is A, a size of cache for printing each page is B, and the distance passed through by the printing stock from the former two colors nozzle to the latter two colors nozzle is the length of the n pages, then A is limited to A>n*B. If A is not enough, the printing cannot be completed correctly.

3. A step of choosing to print the first page on the recto or the verso on the interface.

4. If the first page is chosen to be printed on the verso, then the method may further include setting the data spaces of the former two colors in the storage spaces to 0, then the method goes to step 6.

5. If the first page is chosen to be printed on the recto, then the method may further include reading by the DCS a page of four-color page lattice data from a hard disk and setting the M and K colors of the four-color page lattice data into the former two colors spaces in the storage spaces.

6. A step of determining there is a next page.

7. If yes, the method may further include reading by the printing controller a page of four-color page lattice from the hard disk and setting the M and K colors of the four-color page lattice into the latter two colors spaces in the storage spaces.

8. If there is no subsequent page, the method may further include setting the latter two colors in the storage space to 0.

9. A step of sending, by the printing controller, the page lattice in the storage space to the DCS when the four colors in the storage space are prepared, and a step of starting by the DCS a printing process after the DCS receives the data of a complete page, in which the printing process is the same as a single side printing.

10. A step of determining there are subsequent data, if yes, repeating the steps of 5-10; if not, the printing is completed.

Figure 8:
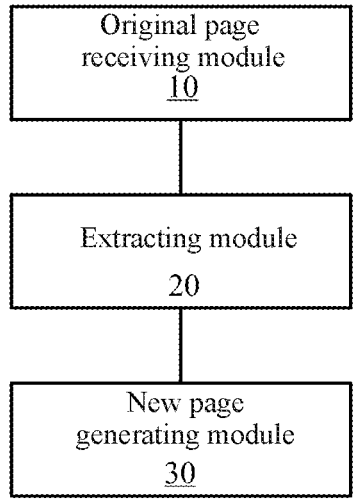
FIG. 8 is a schematic diagram of a printing controller according to an embodiment of the present application.

According to an embodiment of the invention, an apparatus for double-sided printing with two colors includes a printing controller. FIG. 8 is a schematic diagram of a printing controller according to an embodiment of the present application, the printing controller includes an original page receiving module 10, an extracting module 20 and a new page generating module 30.

The original page receiving module 10 is configured to receive two pages of an original four-color page lattice according to a printing order each time.

The extracting module 20 is configured to extract effective data of first and second colors in the two pages of the original four-color page lattice, respectively.

The new page generating module 30 is configured to write the extracted data of the first and second colors into data of first color, second color, third color and fourth color of a new page of four-color page lattice, respectively.

The apparatus according to the embodiment improves the printing efficiency.

Preferably, the original page receiving module is configured to receive two pages of an original four-color page lattice according to a printing order from a first or second page each time. The printing controller may further include a page top inserting module, if the page top inserting module is configured to receive the two pages of the original four-color page lattice according to a printing order from a second page each time, then the page top inserting module is configured to receive a first page of the original four-color page lattice, to generate a new first page of four-color page lattice, to set the data of first and second color therein to null values and to write the data of the first and second colors of the first page of the original four-color page lattice into third and fourth colors of the new first page. The printing controller may further include a page end complementing module, where the page end complementing module is configured to receive two pages of the original four-color page lattice according to a printing order each time and if a single page of the original four-color page lattice is remained at the end, then the page end complementing module is configured to generate a last page of new four-color page lattice, to write the data of the first and second colors of the last page of the original four-color page lattice into first and second colors of the last page of the new four-color page lattice; and to set the third and fourth colors of the last page of the new four-color page lattice to null values.

The apparatus according to the embodiment can be configured to print the first page on a recto or a verso and to use in the case of the last page is a single page.

Figure 9:
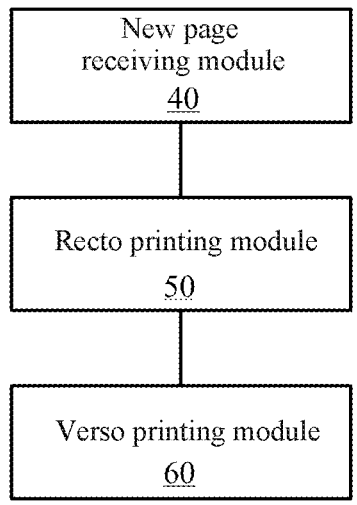
FIG. 9 is a schematic diagram of a digital control system according to an embodiment of the present application.

Preferably, the apparatus for double-sided printing with two colors may further include a digital control system. FIG. 9 is a schematic diagram of a digital control system according to an embodiment of the present application, and the digital control system may include a new page receiving module 40, a recto printing module 50 and a verso printing module 60.

The new page receiving module 40 is configured to receive each page of new four-color page lattice according to a printing order.

The recto printing module 50 is configured to extract data of first and second colors of the new four-color page lattice and print the extracted data to a first side of a printing stock.

The verso printing module 60 is configured to extract data of third and fourth colors of the new four-color page lattice and print the extracted data to a second side of a printing stock.

The digital control system may preset pigments of the first and third colors of the printing device to pigment of a first special color (such as red color) and preset pigments of the second and fourth colors of the printing device to pigment of a second special color (such as black color).

The apparatus according to the embodiment improves the printing efficiency.

Preferably, the apparatus may further include a turnover mechanism configured to turn the printing stock over after the first side is printed and before the second side is printed.

In view of the above, the method and the apparatus according to the embodiments of the invention can improve the printing efficiency and can fast switch to a double-sided printing with two colors on a single side printing platform without two sets of a printing system. Therefore, the method and the apparatus according to the embodiments of the invention can provide users with a great convenience and expand the adaptive scope of a printing device.

It will be readily apparent to those skilled in the art that the modules or steps of the present application may be implemented with a common computing device. In addition, the modules or steps of the present application can be concentrated or run in a single computing device or distributed in a network composed of multiple computing devices. Optionally, the modules or steps may be achieved by using codes of the executable program, so that they can be stored in the storage medium, or the plurality of the modules or steps can be fabricated into an individual integrated circuit module. Therefore, the present application is not limited to any particular hardware, software or combination thereof.

The foregoing is only preferred embodiments of the present application, and it is not intended to limit the present application. Moreover, it will be apparent to those skilled in the art that various modifications and variations can be made to the present application. Thus, any modifications, equivalent substitutions, improvements etc. within the spirit and principle of the present application should be included within the scope of protection of the application.

What is claimed is:

1. A method for double-sided printing with two colors comprising:
   receiving two pages of an original four-color page lattice according to a printing order each time;
   extracting effective data of first and second colors in the two received pages, respectively;
   writing the extracted data into data of a first color, a second color, a third color and a fourth color of a new page of a four-color page lattice, respectively.

2. The method according to claim 1, wherein the step of receiving comprises:
   receiving two pages of the original four-color page lattice according to a printing order each time from a first page of the two pages.

3. The method according to claim 1, wherein the step of receiving comprises:
   receiving two pages of the original four-color page lattice according to a printing order each time from a second page of the two pages, and
   before the receiving from the second page, the method further comprises:
   obtaining a first page of the original four-color page lattice;
   generating a new first page of four-color page lattice, in which the data of first and second color may be set to null values;
   writing the data of the first and the second colors of the first page of the original four-color page lattice into third and fourth colors of the new first page of four-color page lattice.

4. The method according to claim 1, wherein in the case of receiving two pages of the original four-color page lattice according to a printing order each time, if a single page of the original four-color page lattice is remained in the end, the method further includes:
   generating a last page of new four-color page lattice;
   writing the data of the first and the second colors of the remained page into first and second colors of the generated new last page;
   setting the third and fourth colors of the generated new last page to null.

5. The method according to claim 1, wherein the method further includes:
   receiving each page of a new four-color page lattice according to a printing order;
   extracting data of first and second colors of the new four-color page lattice and printing the extracted data to a first side of a printing stock; and
   extracting data of third and fourth colors of the new four-color page lattice and printing the extracted data to a second side of a printing stock;
   wherein pigments of the first and third colors of the printing device are preset to pigment of a first special color, and pigments of the second and fourth colors of the printing device are preset to pigment of a second special color.

6. The method according to claim 5, wherein after the first side is printed, the printing stock is turned over and the second side is printed.

7. An apparatus for double-sided printing with two colors comprising a printing controller, wherein the printing controller comprises:
   an original page receiving module configured to receive two pages of an original four-color page lattice according to a printing order each time;
   an extracting module configured to extract effective data of first and second colors in the received two pages, respectively;
   a new page generating module configured to write the extracted data of the first and second colors into data of first color, second color, third color and fourth color of a new page of a four-color page lattice, respectively.

8. The apparatus according to claim 7, wherein the original page receiving module is configured to receive two pages of the original four-color page lattice according to a printing order from a first page or a second page of the two pages each time, and the printing controller further includes:
   a page top inserting module, if the two pages of the original four-color page lattice are received from the second page each time, the page top inserting module receives the first page, generates a new first page of four-color page lattice, sets the data of first and second color of the new page of four-color page lattice to null values, and writes the data of the first and the second colors of the first page of the original four-color page lattice into third and fourth colors of the new first page.

9. The apparatus according to claim 8, further comprising a digital control system, wherein the digital control system comprises:
   a new page receiving module configured to receive each page of the new four-color page lattice according to a printing order;
   a recto printing module configured to extract data of first and second colors of the new four-color page lattice and print the extracted data to a first side of a printing stock;
   a verso printing module configured to extract data of third and fourth colors of the new four-color page lattice and print the extracted data to a second side of a printing stock.

10. The apparatus according to claim 9, further including a turnover mechanism configured to turn the printing stock over after the first side is printed and before the second side is printed.

11. The method according to claim 2, wherein the method further includes:
   receiving each page of a new four-color page lattice according to a printing order;
   extracting data of first and second colors of the new four-color page lattice and printing the extracted data to a first side of a printing stock; and
   extracting data of third and fourth colors of the new four-color page lattice and printing the extracted data to a second side of a printing stock;
   wherein pigments of the first and third colors of the printing device are preset to pigment of a first special color, and pigments of the second and fourth colors of the printing device are preset to pigment of a second special color.

12. The method according to claim 3, wherein the method further includes:
   receiving each page of a new four-color page lattice according to a printing order;
   extracting data of first and second colors of the new four-color page lattice and printing the extracted data to a first side of a printing stock; and
   extracting data of third and fourth colors of the new four-color page lattice and printing the extracted data to a second side of a printing stock;
   wherein pigments of the first and third colors of the printing device are preset to pigment of a first special color, and pigments of the second and fourth colors of the printing device are preset to pigment of a second special color.

13. The method according to claim 4, wherein the method further includes:
   receiving each page of a new four-color page lattice according to a printing order;
   extracting data of first and second colors of the new four-color page lattice and printing the extracted data to a first side of a printing stock; and
   extracting data of third and fourth colors of the new four-color page lattice and printing the extracted data to a second side of a printing stock;
   wherein pigments of the first and third colors of the printing device are preset to pigment of a first special color, and pigments of the second and fourth colors of the printing device are preset to pigment of a second special color.

14. The apparatus according to claim 7, wherein the original page receiving module is configured to receive two pages of the original four-color page lattice according to a printing order from a first page or a second page of the two pages each time, and the printing controller further includes:
   a page end complementing module, if said two pages of original four-color page lattice is received according to a printing order each time and if a single page of original four-color page lattice is remained in the end, then the page end complementing module generates a last page of a new four-color page lattice, writes the data of the first and second colors of the remained page into first and second colors of the new last page; and sets the third and fourth colors of the new last page to null values.

15. An apparatus for double-sided printing with two colors comprising a printing controller, wherein the printing controller comprises:
   a processor configured to
   receive two pages of an original four-color page lattice according to a printing order each time;
   extract effective data of first and second colors in the received two pages, respectively;
   write the extracted data of the first and second colors into data of first color, second color, third color and fourth color of a new page of four-color page lattice, respectively.

* * * * *